United States Patent
Garrison Stuber et al.

(10) Patent No.: US 10,790,878 B1
(45) Date of Patent: Sep. 29, 2020

(54) SYSTEMS AND METHODS FOR REAL-TIME COMMUNICATION AMONG A CLUSTER OF IMPEDANCE INJECTION NODES IN A POWER DISTRIBUTION SYSTEM

(71) Applicant: Smart Wires Inc., Union City, CA (US)

(72) Inventors: Michael T. Garrison Stuber, Newman Lake, WA (US); Adeel Ahmad Khan, Lahore (PK); Haroon Inam, San Jose, CA (US)

(73) Assignee: Smart Wires Inc., Union City, CA (US)

(*) Notice: Subject to any disclaimer, the term of this patent is extended or adjusted under 35 U.S.C. 154(b) by 0 days.

(21) Appl. No.: 16/209,762

(22) Filed: Dec. 4, 2018

Related U.S. Application Data

(60) Provisional application No. 62/718,245, filed on Aug. 13, 2018.

(51) Int. Cl.
*H04B 3/54* (2006.01)
*H04L 9/06* (2006.01)
*H04L 12/58* (2006.01)

(52) U.S. Cl.
CPC ............ *H04B 3/542* (2013.01); *H04B 3/544* (2013.01); *H04L 9/0618* (2013.01); *H04L 9/0643* (2013.01); *H04L 51/02* (2013.01); *H04L 51/30* (2013.01)

(58) Field of Classification Search
CPC ....... H04B 3/542; H04B 3/544; H04L 9/0618; H04L 9/0643; H04L 51/02; G01R 21/00; G01R 15/00
See application file for complete search history.

(56) References Cited

U.S. PATENT DOCUMENTS

| | | | |
|---|---|---|---|
| 6,583,994 B2 | 6/2003 | Clayton et al. | |
| 6,996,712 B1 * | 2/2006 | Perlman | H04L 9/3247 380/268 |
| 7,499,451 B2 | 3/2009 | Suzuki | |
| 7,940,706 B2 | 5/2011 | Elko et al. | |
| 9,047,351 B2 | 6/2015 | Riddle et al. | |
| 9,271,057 B2 | 2/2016 | DeLoach, Jr. | |
| 9,454,137 B2 | 9/2016 | Brainard et al. | |
| 9,590,426 B2 | 3/2017 | Yun et al. | |
| 2006/0136458 A1 | 6/2006 | Elko et al. | |

(Continued)

*Primary Examiner* — Nabil H Syed
(74) *Attorney, Agent, or Firm* — Womble Bond Dickinson (US) LLP

(57) ABSTRACT

Systems and methods for controlling power distribution in a power distribution system are disclosed. The system comprises a first group of impedance injection nodes that includes two or more impedance injection nodes. Each of the impedance injection nodes of the first group is attached to a respective powerline of the power distribution system, and is configured to: respectively receive messages from other impedance injection nodes in the first group sent at different respective time slots, where each of the received messages includes node information of at least one of the other nodes, and broadcast a message to the other nodes in the first group at a time slot that is different from the respective time slots of the other nodes, where the broadcasted message includes node information of the impedance injection node, or node information of the at least one of the other nodes, or both.

29 Claims, 5 Drawing Sheets

(56) References Cited

U.S. PATENT DOCUMENTS

| | | | |
|---|---|---|---|
| 2010/0199091 A1* | 8/2010 | Ho | H04L 9/0637 |
| | | | 713/168 |
| 2011/0018704 A1* | 1/2011 | Burrows | H04B 3/54 |
| | | | 340/538 |
| 2012/0284445 A1* | 11/2012 | Parry | G06F 13/4265 |
| | | | 710/305 |
| 2016/0276830 A1 | 9/2016 | Nasirian et al. | |
| 2017/0068639 A1 | 3/2017 | Davis et al. | |
| 2017/0163036 A1* | 6/2017 | Munguia | H02J 3/18 |
| 2019/0104044 A1* | 4/2019 | Yang | H04L 41/0631 |

* cited by examiner

Message Sending Sequence

Message Transmissions

| Time | Node | Message Sent | Observation |
|---|---|---|---|
| T1 | A | A=On | |
| T2 | B | B=On, A=On at T1 | |
| T3 | C | C=On, B=on at T2, A=On at T1 | |
| T4 | A | A=On, C=On at T3, B=On at T2 | |
| T5 | B | | Node B Failure, no Message sent by B |
| T6 | C | C=On, B NoMsgRec'd, A=On at T4 | |
| T7 | A | A=Off, B NoMsgRec'd, C=On at T6 | Synchronized Balance Begins |
| T8 | B | | |
| T9 | C | C=Off, B NoMsgRec'd, A=OFF at T7 | Balance Achieved All Nodes OFF |

SYSTEMS AND METHODS FOR REAL-TIME COMMUNICATION AMONG A CLUSTER OF IMPEDANCE INJECTION NODES IN A POWER DISTRIBUTION SYSTEM

CROSS REFERENCE TO RELATED APPLICATIONS

This application claims the benefit of U.S. Provisional Application No. 62/718,245 filed on Aug. 13, 2018, the disclosure of which is incorporated herein by reference.

TECHNICAL FIELD

Embodiments of the present disclosure relate generally to power distribution systems. More particularly, embodiments of the disclosure relate to systems and methods for real-time communication among a cluster of impedance injection nodes in a power distribution system.

BACKGROUND

One of the requirements of improving the efficiency of a power grid is the removal of transmission bottlenecks. The need is to control where and how the actual power flow is achieved on the power grid. Congested networks limit the system reliability and increase the cost of power delivery across the power grid. To improve the power flow throughput of the grid, it is necessary to be able to adjust the power flowing along any of the wires. Unbalanced lines produce uncontrolled loop currents, overloading the lines resulting in increased losses.

Active power flow control provides the best solution for this problem by altering the line impedances and changing the phase angle between voltage and current on the respective line, thereby controlling power flow. Active power flow control using impedance injection (both capacitive and inductive) with centralized control at the network level has been proposed in the past, but the complexity and cost of such systems have slowed implementation. Most impedance injection grid control capabilities are still ground based, installed at substations with switchable inductive and capacitive loads that have the associated requirements for high-voltage insulation and high-current switching capabilities. Being at the substations, they are able to use cooling methods that include oil cooling, etc. with fewer weight limitations and fewer limitations on the profile of the units used. There is consensus that future power grids will need to be smart and aware, fault tolerant and self-healing, dynamically and statically controllable, and asset and energy efficient. It has also been understood that distributed active impedance injection units that are intelligent and self-aware will be able provide the needed distributed control of the line impedance if such can be effectively implemented with high reliability.

BRIEF DESCRIPTION OF THE DRAWINGS

Embodiments of the disclosure are illustrated by way of example and not limitation in the figures of the accompanying drawings in which like references indicate similar elements.

FIG. 3 is a diagram illustrating a table describing an exemplary intra-group message passing sequence among a group of impedance injection nodes according to one embodiment.

DETAILED DESCRIPTION

Figures 1A, 1B:
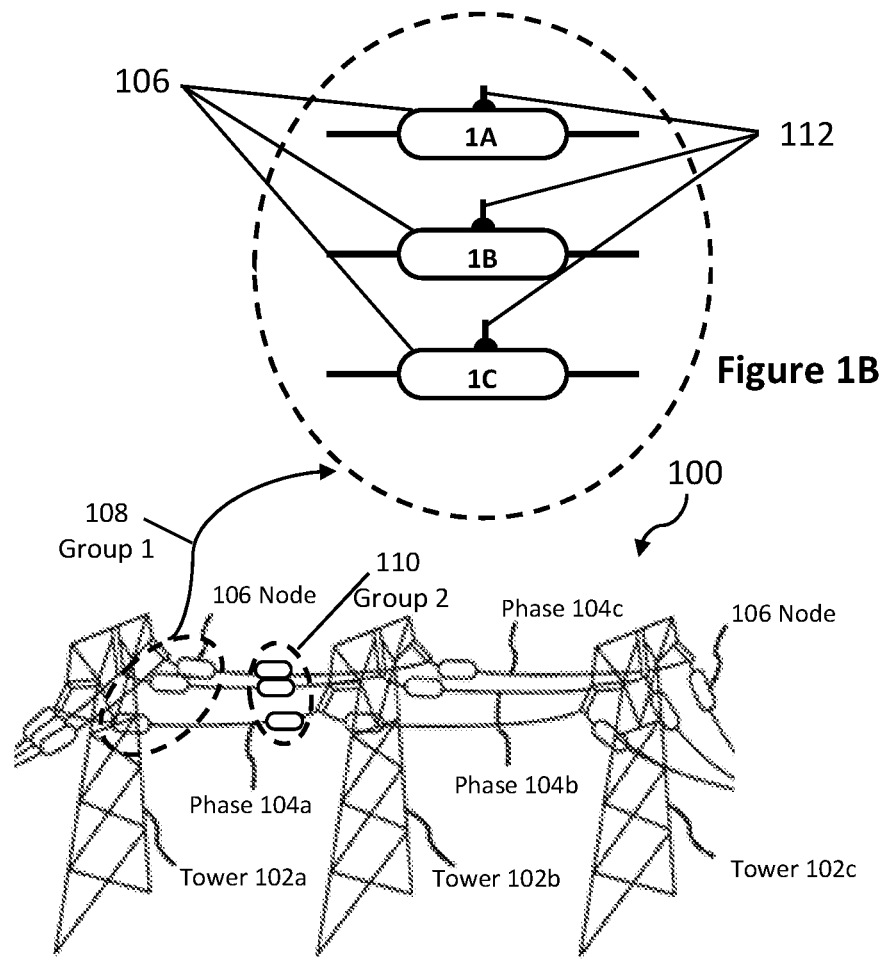
FIG. 1A is a diagram illustrating a three-phase power distribution system according to one embodiment.
FIG. 1B is a diagram illustrating an expanded view of a group of impedance injection nodes according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure provide distributed active impedance injection nodes (also referred to as: impedance injection units; electrical injection units; voltage injection units; current injection units; power flow controllers; FACTS devices; or electrically controlled nodes) typically deployed in groups, for example, sets of three injection nodes per group. As mentioned above, it is important that such systems be fault-tolerant and self-healing. Therefore, a solution is needed such that when one or more nodes in a group fails and ceases to perform impedance injection, the other nodes within the group are immediately informed of that failure in order to compensate for and mitigate the failure. If the failed node ceases to inject impedance, then the other nodes within the group would, for example, also cease to inject impedance in order to re-balance the system. In this way, the distributed active impedance injection units are able to provide the needed distributed control of the line impedance, thereby improving the system power grid efficiency substantially.

To facilitate this mitigation in a short amount of time, a closely coupled communication mechanism is needed. Note also that this same closely coupled communication mechanism is also applicable to any group of electrically controlled nodes that must operate in tight, low-latency communication in order to quickly compensate for a failure of one or more nodes within the group.

According to some embodiments, systems and methods described are for operating a group of impedance injection nodes in a power distribution system, where a failure of one or more nodes among the group could have negative consequences for the power distribution system. A local communication system is described within the group with minimal response latency and round robin message passing such that a failure in one node is communicated to the other nodes in the group within one cycle of a round-robin communication. Those other nodes may take immediate action to cause the overall power line characteristics to remain balanced. While specifically addressing a power (or power line) distribution system, the systems and methods described herein are also applicable to any group of impedance injection nodes that must operate in close coordination with each other, and where a failure of one node in the group requires swift action by the other nodes in the group to mitigate the failure.

While the embodiments described herein are occasionally focused on impedance injection nodes attached to an electrical power distribution system, it should be noted that the interaction between such nodes is applicable to any system where a number of electrically controlled nodes in a group must interact with each other using a low-latency communication protocol, and where as a result of a condition change for one node, the other nodes in the group must react quickly.

In one embodiment, the system comprises a first group of impedance injection nodes that includes two or more impedance injection nodes. Each of the impedance injection nodes of the first group is attached to a respective powerline of the power distribution/transmission system, and is configured to: respectively receive messages from other impedance injection nodes in the first group sent at different respective time slots, where each of the received messages includes node information of at least one of the other nodes, and broadcast a message to the other nodes in the first group at a time slot that is different from the respective time slots of the other nodes, where the broadcasted message includes node information of the impedance injection node, or node information of the at least one of the other nodes, or both. It is noted that "attaching" a node to a power line can include any or all of electrically connecting the node to the power line and placing the node adjacent to or surrounding the power line. It is noted that a node may be physically located in a substation, in a mobile trailer, or on a barge, in addition to being located at a tower or suspended on a power line between towers, although other locations are possible.

FIG. 1A is a diagram illustrating a three-phase power distribution system according to one embodiment. Referring to FIG. 1A, a power distribution/transmission system 100 (e.g., a three-phase power distribution system) includes electrical towers 102a-c that carry a number of phases (or powerlines) 104a-c (e.g., three phases in this particular case). In FIG. 1A, a first group of impedance injection nodes 108 includes three nodes, such as node 106, and a second group of impedance injection nodes 110 also includes three nodes, such as node 106. In one embodiment, each node (e.g., distributed series reactor) in the first group 108 and second group 110 may modify one or more characteristics of the power line it is attached to. For example, a form of such modification may include injecting impedance into a power line to which each node 106 is attached. In one embodiment, node 106 may include sensor circuitry for monitoring the status of the power line and triggering protection circuits.

Turning now to FIG. 1B, which is a diagram illustrating an expanded view of a group of impedance injection nodes according to one embodiment, the first group of impedance injection nodes 108 may include three nodes 106 respectively labeled as 1A, 1B and 1C. In one embodiment, where communication among the nodes of the first group 108 (i.e., intra-group communication) or nodes of different groups (i.e., inter-group communication) is performed wirelessly, each of the nodes within group 108 (and group 110) may include a wireless transceiver (or radio) 112. Wireless transceiver 112 may also be utilized to accept external configuration and control commands, which are used to provide additional instructions to a voltage converter (not shown), which is generally well known to people of ordinary skill in the art. That is, the voltage converter is configured to inject (or cease to inject) an inductive load onto the high voltage transmission line based on the instructions, and may also have the capability of injecting a capacitive load on the transmission for power factor control. The voltage converter may further control harmonic content in the high-voltage transmission line. In addition to the communication protocols described herein for communicating among the nodes, in one embodiment, the nodes may also communicate to a central controller or base station (not shown) located on a tower, for example any of towers 102a-c, or elsewhere within the power distribution system 100.

It should be noted that while FIG. 1A shows three towers 102a, 102b and 102c carrying three phases 104a, 104b and 104c, any number of towers and phases may be included in system 100. It should also be noted that while FIGS. 1A-1B show each of the groups 108 and 110 as having three impedance injection nodes, any number of nodes may be included in each group. It should further be noted that any communication mechanism for either inter-group or intra-group communications among the nodes (as described in more detail herein below) may be utilized, including for example wired, wireless, or laser communication.

Figure 2A:
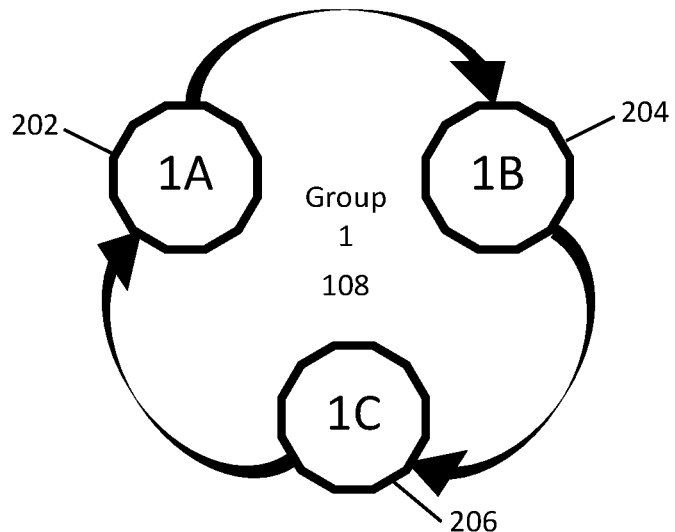
FIG. 2A is a diagram illustrating an exemplary message sending sequence for a group of impedance injection nodes according to one embodiment.
Figure 2B:
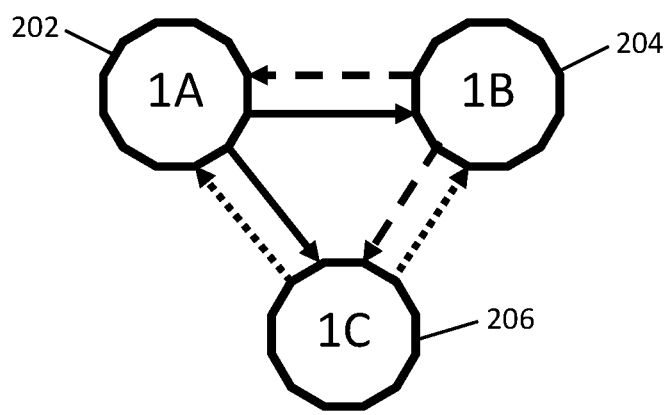
FIG. 2B is a diagram illustrating exemplary message transmission paths for a group of impedance injection nodes according to one embodiment.

FIG. 2A is a diagram illustrating an exemplary message sending sequence for a group of impedance injection nodes according to one embodiment. Referring to FIG. 2A, first group 108 may include impedance injection nodes 202, 204 and 206 respectively labelled as 1A, 1B and 1C. A message may be sent or broadcasted by any of nodes 202-206 and received by other or remaining nodes in group 108. For example, referring to FIG. 2B, which is a diagram illustrating exemplary message transmission paths for a group of impedance injection nodes according to one embodiment, a message sent by node 202 may be received by nodes 204 and 206, a message sent by node 204 may be received by nodes 202 and 206, a message sent by node 206 may be received by nodes 202 and 204, and so on. Notwithstanding the embodiment of FIG. 2B, referring back to FIG. 2A, the sequence in which messages are sent may be implemented in a form of a round-robin sequence (or communication cycle), in one embodiment. That is, at respective time slots assigned in the round-robin sequence, node 202 (1A) may send a message to node 204 (1B), node 204 (1B) in turn may send a message to node 206 (1C), and node 206 (1C) in turn may send a message to node 202 (1A), thereby transmitting the messages in circular order within group 108.

FIG. 3 is a diagram illustrating a table describing an exemplary intra-group message passing sequence among a group of impedance injection nodes according to one embodiment. Referring to FIG. 3, table 300 may include columns 302, 304, 306, and 308. Column 302 may include a number of time slots (e.g., time T1 through T9 in this case) where an impedance injection node may send information or messages. Column 304 may include node identifiers (IDs) of specific nodes that send messages in their respective time slots (e.g., time T1 through T9). In the example of FIG. 3, there are three different nodes (with respective identifiers A, B, and C) within a group of nodes (e.g., first group 108 of FIG. 1A) that send messages to one another. In one embodiment, nodes A, B, C in column 304 may respectively be nodes 202-206 of FIGS. 2A-2B. In one embodiment, time slots T1-T9 may be assigned to nodes A, B and C in a round-robin sequence, as previously described.

With continued reference to FIG. 3, column 306 of table 300 shows examples of messages sent by each node (e.g., node A, B or C) within the group, where each message includes node information of one or more particular nodes at a specific time slot. This node information includes, for example as shown at cell 310, the current functional status, such as an active status ("On"), inactive status ("OFF"), or failure status ("NoMsgRec'd") of a particular node, and/or the status of other (or remaining) nodes in the group according to messages received in one or more prior time slots (as shown in column 302). As further shown in FIG. 3, column 308 of table 300 includes observations (or comments) made at each time slot based on the node information. For example, should a failure occur in any node within the group, such as a failure of Node B as indicated at observation 312, the failed node would not send a message during its assigned time slot. As such, observation 312 indicates that no message was sent by node B in time slot T5 and therefore the failure of node B is indicated. Appropriately, in time slot T6, node C sends message 314 which includes an indication that no message was received from Node B. Subsequently, in time slot T7 a synchronization process begins to balance the characteristic actions of the three nodes in the group (as indicated at observation 316). In an exemplary embodiment where these nodes inject impedance into the power lines they are respectively attached to, the failure of Node B requires Nodes A and C to likewise turn off their actions, in this case ceasing to inject impedance, for example by controlling their respective voltage converters (as previously described). In time slot T9, observation 318 indicates that balance has been achieved since the other nodes in the group have succeeded in turning off, thereby balancing the system given the failure of Node B.

In some embodiments, a system according to the disclosure may also include a number of groups of impedance injection nodes, including second group 110 as shown in FIG. 1A. Communications between group 108 and group 110, and/or within either group, may be performed by either wired or wireless communication, where any wireless communication may be performed, for example by radio frequency (RF) and/or laser communication. Communication within a group is referred to as intra-group communication (as shown in FIG. 4A), and communication between separate groups is referred to as inter-group communication (as shown in FIG. 4B).

Figure 4A:
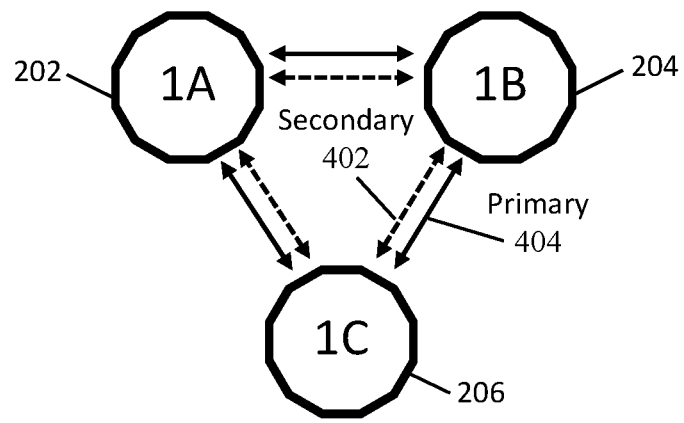
FIG. 4A is a diagram illustrating multiple intra-group communication links among a group of impedance injection nodes according to one embodiment.

Referring to FIG. 4A, which is a diagram illustrating multiple intra-group communication links among a group of impedance injection nodes according to one embodiment, within group 108, primary communication link 404 and a secondary (or alternate communication link) 402 may be established. In one embodiment, when one or more status messages received by a node (e.g., node 202) indicating that another node (e.g., node 204) in the same group is suspected to have failed, the receiving node (e.g., node 202) may attempt to receive a message from the suspect node (e.g., node 204) on alternate communication link 402.

Figure 4B:
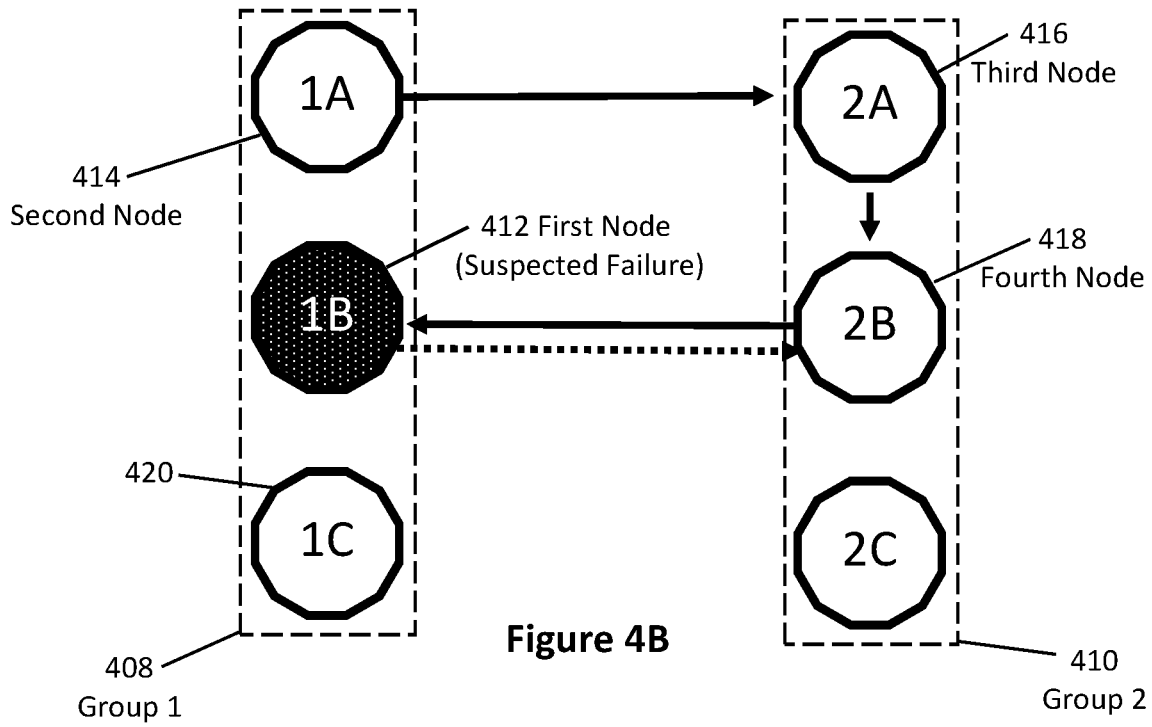
FIG. 4B is a diagram illustrating multiple inter-group communication links among different groups of impedance injection nodes according to one embodiment.

With reference to FIG. 4B, which is a diagram illustrating multiple inter-group communication links among different groups of impedance injection nodes according to one embodiment, communication links may be established between any or all nodes in first group 408 and any or all nodes in second group 410. As shown in FIG. 4B, each node in the first group 408 also communicates with at least a corresponding node in the second group of nodes 410. For example, in one embodiment, when a first node 412 (1B) in the first group of nodes 408 is suspected of having a failure, a second node 414 in the first group 408 may communicate a message to a third node 416 in the second group 410 indicating the suspected failure of the first node 412. In response to the message, the third node 416 in the second group may communicate with a fourth node 418 in the second group 410 that is normally in communication with the first node 412 in the first group. That is, the third node 416 may request the fourth node 418 to confirm that the suspected first node 412 is not communicating and has probably failed. If the fourth node 418 in the second group 410, after one or more attempts, fails to receive a positive indication of functional status from the suspect first node 412 in the first group 408, then it is determined that the first node in the first group has failed. Accordingly, the confirmation of failure is communicated to the other nodes (e.g., nodes 414 and 420) in group 408 resulting in nodes 414 and 420 taking one or more actions to mitigate the effects of the failure. For example, nodes 414 and 420 may cease to inject impedance into the power lines they are attached to in order to achieve balance within the power distribution system.

Note that if the third node 416 is unable to communicate with the fourth node 418, but is able to communicate with node 2C in FIG. 4B, it may indicate a failure of the power line (or phase) served by and attached to nodes 412 (1B) and 418 (2B), rather than indicating a failure of node 412. In one embodiment, each impedance injection node also includes an additional circuit that confirms a hardware failure of the node and sends a message on an alternate communication channel or link to another node, or to a central controller function, indicating such failure.

Also, as with many electrical systems that need to be protected from cyber-attack, the present disclosure adds security by including a cryptographic message integrity code that is added to each status message (e.g., the messages of table 300 in FIG. 3) and is decoded and/or verified by the receiving nodes before they take action. That message integrity code can be generated using any one of a number of cryptographic encoding techniques or methods including; using a keyed hash based on some pre-shared secret value, and using a block cypher with authenticated encryption. The message integrity code can include the time, the sending node, and the contents of the message as shown for example in FIG. 3. This enables the receiving nodes to automatically identify messages with an incorrect time and/or an incorrect message integrity code, thereby avoiding both forged messages from attackers and replayed messages.

Figure 5:
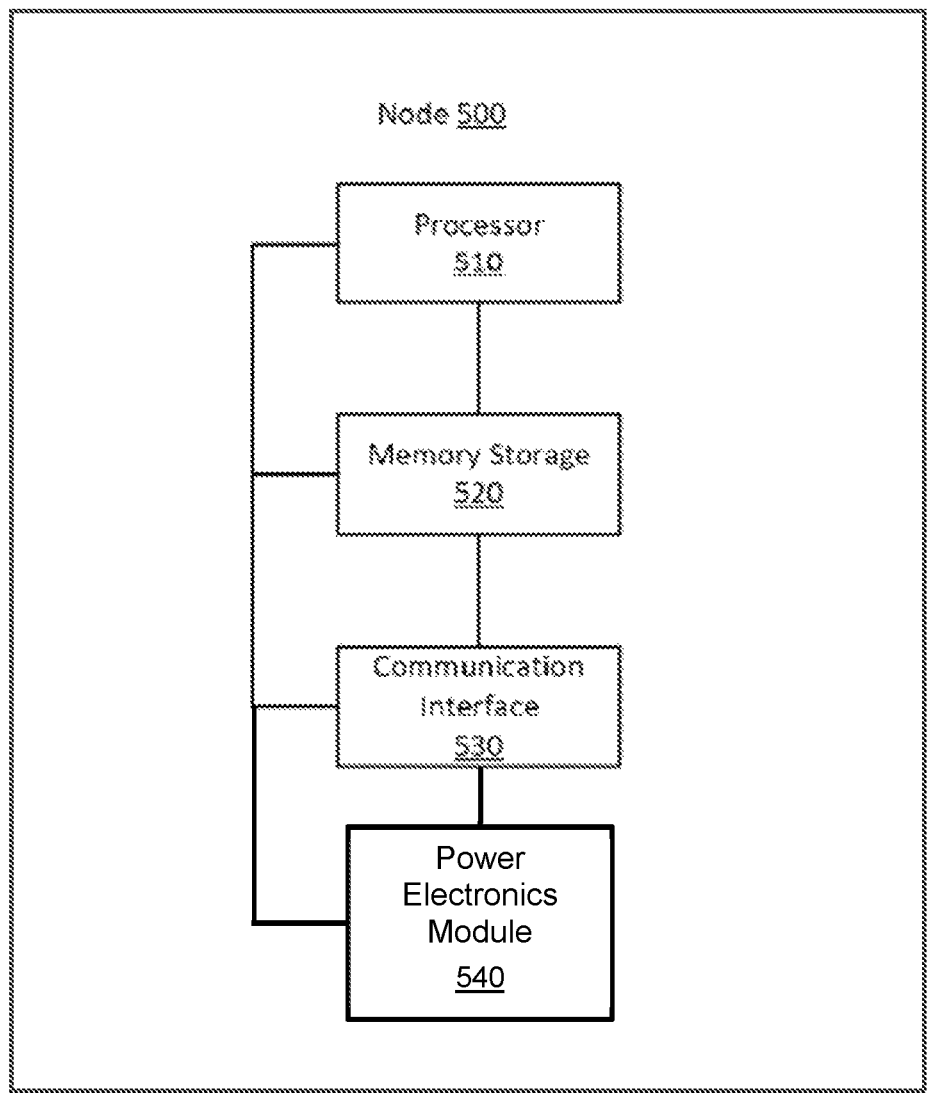
FIG. 5 is a diagram illustrating example components of an impedance injection node according to one embodiment.

FIG. 5 is a diagram illustrating example components of an impedance injection node according to one embodiment. Referring to FIG. 5, example components of node 500 include processor 510, memory storage 520, and communication interface 530, and power electronics module 540 that controls impedance injection. Power electronics module 540 also includes an interface for receiving various status values for components within node 500, including status values indicating health of the node. Should such status indicate that node 500 has failed in any way, such information is transmitted to processor 510 such that the failure can be included in one or more messages sent by communications interface 530 according to the message passing sequence of FIG. 3. In some embodiments, node 500 may represent any of the impedance injection nodes (e.g., nodes 202-206), as previously described.

The communication interface 530 may be a network communication interface such as a wired network interface (e.g., an IEEE 802.3 Ethernet interface), as well as a wireless interface (e.g., an IEEE 802.11 WiFi interface). Data may also be received from any one of a variety of different wireless communications networks and in accordance with any one of several different protocols. These include: a cellular mobile phone network (e.g. a Global System for Mobile communications, GSM, network), including current 2G, 3G, 4G, 5G, and LTE networks; an IEEE 802.11 network (WiFi or Wireless Local Area Network, WLAN); and proprietary RF communication over ISM. In one embodiment, communication interface 530 may be coupled to a wireless transceiver (e.g., wireless transceiver 112) in order to communicate with other nodes.

The processor 510 that is coupled to the communication interface 530 may include a microprocessor, a microcontroller, a digital signal processor, or a central processing unit (CPU), and other needed integrated circuits such as glue logic. The term "processor" may refer to a device having two or more processing units or elements, e.g. a CPU with multiple processing cores. The processor 510 may be used to control the operations of the communication interface 530. For example, the processor 510 may be coupled to the communication interface 530 and executes software to control the wireless network communications functionality of the node 500 (e.g. communicating with a network to transmit and receive data to other nodes via the communication interface 530). In some cases, a particular function may be implemented as two or more pieces of software that are being executed by different hardware units of a processor.

In one embodiment, the processor 510 is also coupled to the memory storage 520 that may include one or more different types of storage such as hard disk drive storage, nonvolatile memory, and volatile memory such as dynamic random access memory. The memory device 520 may also store instructions (e.g. software; firmware), which may be executed by the processor 510. In one embodiment, when the instructions stored in memory device 520 are executed by the processor 510, the processor 510 performs methods for operating one or more groups of impedance injection nodes (e.g., intra-group and/or inter-group communications), as previously described.

In one embodiment, the processor 510, memory storage 520, and communication interface 530 may communicate to input devices and output devices via one or more communication links such as a bus. The communication links may also be other wired or wireless communication links.

Embodiments herein may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the disclosure has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for controlling power distribution in a power distribution system, comprising:
   a first group of impedance injection nodes that includes two or more impedance injection nodes, wherein each of the impedance injection nodes of the first group is attached to a respective powerline of the power distribution system, and is configured to:
      respectively receive messages from other impedance injection nodes in the first group sent at different respective time slots, wherein each of the received messages includes node information of at least one of the other nodes, and
      broadcast a message to the other nodes in the first group at a time slot that is different from the respective time slots of the other nodes, wherein the broadcasted message includes node information of the impedance injection node, or node information of the at least one of the other nodes, or both;
   wherein the impedance injection node includes a voltage converter that modifies one or more electrical characteristics of the respective power line it is attached to; and
   wherein when the impedance injection node determines that one of other nodes has failed, the impedance injection node ceases to modify the one or more electrical characteristics of the respective power line it is attached to.

2. The system of claim 1, wherein each of the impedance injection nodes of the first group is further configured to add a cryptographic message integrity code into the message prior to broadcasting the message, and to verify each of the received messages.

3. The system of claim 2, wherein the cryptographic message integrity code is generated using a cryptographic encoding method including a keyed hash based on a pre-shared secret value.

4. The system of claim 2, wherein the cryptographic message integrity code is generated using a using a block cypher with authenticated encryption.

5. The system of claim 2, wherein the cryptographic message integrity code includes (i) the time slot, (ii) a node identifier (ID) of the impedance injection node, and (iii) node information of the impedance injection node, or node information of the at least one of the other nodes, or both.

6. The system of claim 1, wherein the broadcasted message includes the node information of the at least one of the other nodes and a node identifier (ID) of the impedance injection node, wherein the node information of the at least one of the other nodes includes a functional status and a transmission time slot of each of the at least one of the other nodes.

7. The system of claim 1, wherein when the impedance injection node receives a first message indicating a failure of one of the other nodes, the impedance injection node is further configured to automatically mitigate the failure.

8. The system of claim 1, wherein when the impedance injection node fails to receive an expected message from one of the other nodes at a receiving time slot, the impedance injection node determines that the other node has failed.

9. The system of claim 1, wherein the one or more electrical characteristics include an impedance of the power line.

10. The system of claim 1, wherein the first group of impedance injection nodes comprises three impedance injection nodes, and wherein each node is installed on the respective power line carrying one phase of an electrical power transmission.

11. The system of claim 1, wherein when the impedance injection node receives a first message indicating a failure of one of the other nodes, the impedance injection node attempts to receive the first message from the other node on an alternate communication link.

12. A system for controlling power distribution in a power distribution system, comprising:
a first group of impedance injection nodes that includes two or more impedance injection nodes, wherein each of the impedance injection nodes of the first group is attached to a respective powerline of the power distribution system, and is configured to:
respectively receive messages from other impedance injection nodes in the first group sent at different respective time slots, wherein each of the received messages includes node information of at least one of the other nodes, and
broadcast a message to the other nodes in the first group at a time slot that is different from the respective time slots of the other nodes, wherein the broadcasted message includes node information of the impedance injection node, or node information of the at least one of the other nodes, or both; and
a second group of impedance injection nodes;
wherein each of the impedance injection nodes in the first group communicates with a corresponding node in the second group;
wherein when a first node of the first group is suspected to have failed, a second node of the first group communicates a first message to a third node of the second group indicating the suspected failure of the first node;
wherein the third node then communicates a second message to a fourth node of the second group indicating the suspected failure of the first node, wherein the fourth node is a corresponding node of the first node; and
wherein when the fourth node fails to receive a third message indicating a positive functional status from the first node after one or more attempts, the fourth node determines that the first node has failed.

13. The system of claim 1, wherein each of the impedance injection nodes in the first group is further configured to send another message to a second impedance injection node on an alternate communication link or to a central controller in response to a determination that a first impedance injection node has failed, wherein the other message includes an indication of the failure of the first impedance injection node.

14. A method for controlling power distribution in a power distribution system, the method being performed by each impedance injection node of a first group of two or more impedance injection nodes, wherein each impedance injection node is attached to a respective powerline of the power distribution system, wherein each impedance injection node of the first group includes a voltage converter that modifies one or more electrical characteristics of the respective power line it is attached to, the method comprising:

respectively receiving messages from other impedance injection nodes in the first group sent at different respective time slots, wherein each of the received messages includes node information of at least one of the other nodes;
broadcasting a message to the other nodes in the first group at a time slot that is different from the respective time slots of the other nodes, wherein the broadcasted message includes node information of the impedance injection node, or node information of the at least one of the other nodes, or both; and
in response to determining that one of other nodes has failed, ceasing to modify the one or more electrical characteristics of the respective power line it is attached to.

15. The method of claim 14, further comprising:
adding a cryptographic message integrity code into the message prior to broadcasting the message; and
verifying each of the received messages.

16. The method of claim 15, wherein the cryptographic message integrity code is generated using a cryptographic encoding method including a keyed hash based on a pre-shared secret value.

17. The method of claim 15, wherein the cryptographic message integrity code includes (i) the time slot, (ii) a node identifier (ID) of the impedance injection node, and (iii) node information of the impedance injection node, or node information of the at least one of the other nodes, or both.

18. The method of claim 14, wherein the broadcasted message includes the node information of the at least one of the other nodes and a node identifier (ID) of the impedance injection node, wherein the node information of the at least one of the other nodes includes a functional status and a transmission time slot of each of the at least one of the other nodes.

19. The method of claim 14, further comprising: in response to receiving a first message indicating a failure of one of the other nodes, automatically mitigating the failure of the other node.

20. The method of claim 14, in response to failing to receive an expected message from one of the other nodes at a receiving time slot, determining that the other node has failed.

21. The method of claim 14, wherein the first group of impedance injection nodes comprises three impedance injection nodes, and wherein each node is attached to the respective power line carrying one phase of an electrical power transmission.

22. The method of claim 14, further comprising: in response to receiving a first message indicating a failure of one of the other nodes, attempting to receive the first message from the other node on an alternate communication link.

23. A method for controlling power distribution in a power distribution system, the method being performed by each impedance injection node of a first group of two or more impedance injection nodes, wherein each impedance injection node is attached to a respective powerline of the power distribution system, the method comprising:
respectively receiving messages from other impedance injection nodes in the first group sent at different respective time slots, wherein each of the received messages includes node information of at least one of the other nodes;
broadcasting a message to the other nodes in the first group at a time slot that is different from the respective time slots of the other nodes, wherein the broadcasted message includes node information of the impedance injection node, or node information of the at least one of the other nodes, or both; and in response to suspecting that a first node of the first group has failed, communicating a first message to a second node of a second group of impedance injection nodes indicating the suspected failure of the first node;

wherein the second node then communicates a second message to a third node of the second group indicating the suspected failure of the first node, wherein the third node is a corresponding node of the first node; and wherein when the third node fails to receive a third message indicating a positive functional status from the first node after one or more attempts, the third node determines that the first node has failed.

24. The method of claim 14, further comprising:
sending another message to a second impedance injection node on an alternate communication link or to a central controller in response to determining that a first impedance injection node has failed, wherein the other message includes an indication of the failure of the first impedance injection node.

25. The system of claim 1, further comprising:
a second group of impedance injection nodes;
wherein each of the impedance injection nodes in the first group communicates with a corresponding node in the second group;
wherein when a first node of the first group is suspected to have failed, a second node of the first group communicates a first message to a third node of the second group indicating the suspected failure of the first node;
wherein the third node then communicates a second message to a fourth node of the second group indicating the suspected failure of the first node, wherein the fourth node is a corresponding node of the first node; and wherein when the fourth node fails to receive a third message indicating a positive functional status from the first node after one or more attempts, the fourth node determines that the first node has failed.

26. The system of claim 12, wherein when the impedance injection node receives a first message indicating a failure of one of the other nodes, the impedance injection node is further configured to automatically mitigate the failure.

27. The system of claim 12, wherein when the impedance injection node fails to receive an expected message from one of the other nodes at a receiving time slot, the impedance injection node determines that the other node has failed.

28. The system of claim 12, wherein when the impedance injection node receives a first message indicating a failure of one of the other nodes, the impedance injection node attempts to receive the first message from the other node on an alternate communication link.

29. The method of claim 14, further comprising:
in response to suspecting that a first node of the first group has failed, communicating a first message to a second node of a second group of impedance injection nodes indicating the suspected failure of the first node;
wherein the second node then communicates a second message to a third node of the second group indicating the suspected failure of the first node, wherein the third node is a corresponding node of the first node; and
wherein when the third node fails to receive a third message indicating a positive functional status from the first node after one or more attempts, the third node determines that the first node has failed.

* * * * *